United States Patent
Ashtiani et al.

(10) Patent No.: US 6,454,303 B2
(45) Date of Patent: Sep. 24, 2002

(54) METHOD AND APPARATUS FOR VIBRATION CONTROL

(75) Inventors: Mansour Ashtiani, Beverly Hills, MI (US); Kenneth Alan Gassman, Springboro; Rale Richard Wolf, Dayton, both of OH (US); Robert N Jacques, Andover, MA (US); Elizabeth M Marsh, Melrose, MA (US); Edward Crawley, Cambridge, MA (US)

(73) Assignees: Delphi Technologies, Inc., Troy, MI (US); Active Control Experts, Inc., Cambridge, MA (US)

( * ) Notice: Subject to any disclaimer, the term of this patent is extended or adjusted under 35 U.S.C. 154(b) by 0 days.

(21) Appl. No.: 09/781,055

(22) Filed: Feb. 9, 2001

Related U.S. Application Data

(60) Provisional application No. 60/220,272, filed on Jul. 24, 2000.

(51) Int. Cl.$^7$ .................................................. B62D 1/16
(52) U.S. Cl. ....................................................... 280/779
(58) Field of Search ............................. 280/731, 728.2, 280/779; 74/552

(56) References Cited

U.S. PATENT DOCUMENTS

| | | | | |
|---|---|---|---|---|
| 4,612,425 A | * | 9/1986 | Kanai et al. | 200/61.55 |
| 4,712,446 A | * | 12/1987 | Kamata et al. | 74/492 |
| 6,164,689 A | * | 12/2000 | Rivin et al. | 280/731 |

FOREIGN PATENT DOCUMENTS

| | | | | |
|---|---|---|---|---|
| JP | 04011568 A | * | 1/1992 | 74/552 |
| JP | 06001247 A | * | 1/1994 | 74/552 |
| JP | 06270817 A | * | 9/1994 | 280/731 |

* cited by examiner

Primary Examiner—Paul N. Dickson
Assistant Examiner—Faye M. Fleming
(74) Attorney, Agent, or Firm—Kathryn A. Marra

(57) ABSTRACT

A method and apparatus for a damped steering assembly are provided. The damped steering assembly includes a steering wheel attached to a steering column. Disposed between the steering wheel and the steering column is an active vibration control mechanism. The active vibration control mechanism damps vibration transmitted from the steering column to the steering wheel.

37 Claims, 3 Drawing Sheets

METHOD AND APPARATUS FOR VIBRATION CONTROL

CROSS REFERENCE TO RELATED APPLICATIONS

This application claims the benefit of U.S. Provisional Application No. 60/220,272 filed on Jul. 24, 2000, the contents of which are incorporated herein by reference thereto.

TECHNICAL FIELD

The field of this disclosure relates to vibration control, and more particularly, to an apparatus and method for controlling the vibration of a steering wheel.

BACKGROUND

Vibrations are propagated through the mechanical structure of vehicle steering systems. The vibrations are created by the engine and by the interface of tires on road surfaces. The vibrations are transmitted to the steering system components and are ultimately transmitted to the steering wheel.

Improvements to the steering system performance can be gained by reducing the vibration of the steering system transmitted to the steering wheel. Passive isolation would make the structure softer which could also increase the transmission at the resonant frequency. A passive isolator will require that the isolation system be so flexible that the structural integrity of the system would make this system infeasible or performance must be sacrificed. These passive vibration control techniques make the steering system more bulky in applications where increasing the weight of the structures in the system is undesirable. Thus, there is a need in the art for improved control of the vibration transmitted to the steering wheel.

SUMMARY

A method and apparatus for a damped steering assembly as disclosed herein. The damped steering assembly includes a steering wheel attached to a steering column. Disposed between the steering wheel and the steering column is an active vibration control mechanism. The active vibration control mechanism damps vibration transmitted from the steering column to the steering wheel. The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example, with references to the accompanying drawings, wherein like elements are numbered alike in the several figures in which.

DESCRIPTION OF THE PREFERRED EMBODIMENT

Figure 1:
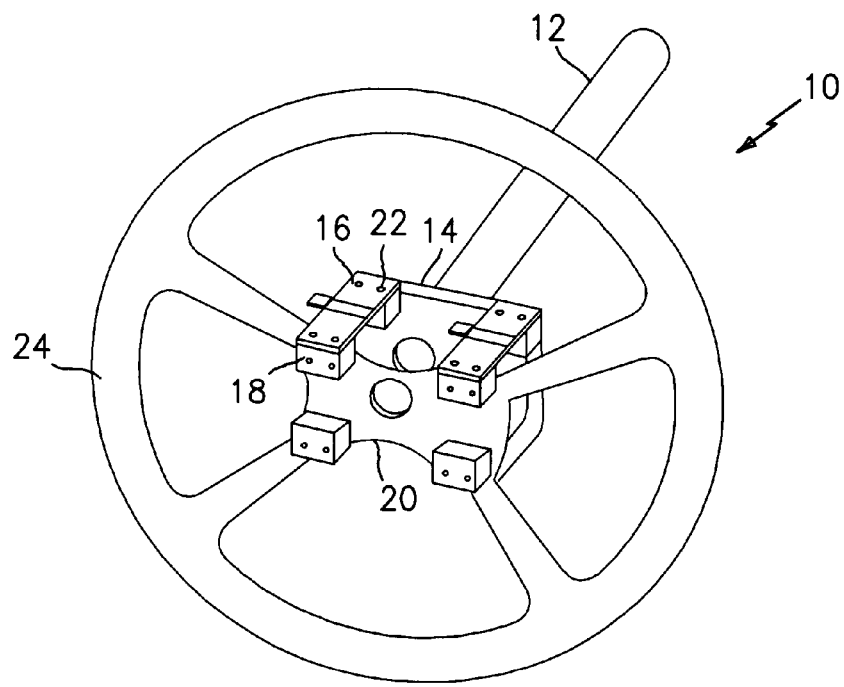
FIG. 1 is a perspective view of an exemplary embodiment of a damped steering assembly.

Referring to FIG. 1, a steering assembly 10 is shown. Steering assembly 10 is configured to have an active vibration control system for damping vibrations in the steering assembly. A part of a steering column 12 or steering rod is connected with a rimless hub 14 at one end and a steering mechanism (not shown) at the other.

The rimless hub 14 is connected in any suitable manner to the steering column 12 so that there is no relative motion between the rimless hub 14 and the steering column 12. The rimless hub 14 is attached to the steering column 12 distal to the remainder of the steering system components, such as the steering box (not shown).

In a preferred embodiment, the rimless hub 14 is a conventional steering wheel hub. Coupled to the rimless hub 14 is a flexure element 16. In a preferred embodiment, there are four flexure elements 16 mounted to the rimless hub 14. In other embodiments, there may be a plurality of flexure elements.

The flexure element 16 may be coupled to the rimless hub in any manner. In a preferred embodiment, the flexure element 16 is mounted to the rimless hub 14 by the use of an adapter 18. There can be a plurality of adapters 18. In a preferred embodiment, the adapter 18 is used to make a rigid connection between the flexure elements 16, rimmed hub 20, and the rimless hub 14.

The adapter 18 is mounted to the rimless hub 14 and the flexure element 16. In the preferred embodiment, the flexure element 16 is coupled to the adapter 18 by the use of a flexure mount 22.

There can be a plurality of flexure mounts 22. The flexure mount 22 may be any means of fixedly coupling a flexure element 16 to an adapter 18. In the preferred embodiment, the flexure mount 22 is a threaded fastener and nut assembly. In another embodiment, the flexure element 16 and the flexure mount 22 can be formed together to accomplish coupling to the rimless hub 14.

The rimmed hub 20 is coupled to the flexure element 16 distal to the rimless hub in relation to the steering column 12. The rimmed hub 20 is coupled to the flexure element 16 in a manner that fixes the rimmed hub 20 relative to the rimless hub 14. Rotation about the long axis of the steering column 12 by the rimmed hub 20 translates to rotation about the long axis of the steering column 12 by the rimless hub 14 and in turn, rotation of the steering column 12 about its long axis.

The primary movement of the rimmed hub 20 is in the rotation of the steering column 12 of the damped steering assembly 10. Flexure element 16 is coupled to the rimmed hub 20 by a plurality of flexure mounts 22. In an exemplary embodiment, each flexure element 16 is secured by two flexure mounts 22 and two adaptors 18. Of course, the number of flexure mounts 22 and adapters 18 may vary. In a preferred embodiment, the rimmed hub 20 is mounted to four flexure elements 16 by use of at least two flexure mounts 22 and two adapters 18 for each flexure element 16.

A steering wheel 24 is connected to the rimmed hub 20. The steering wheel 24 is coupled in any manner that fixes the steering wheel 24 to the rimmed hub 20 such that the steering wheel 24 and the rimmed hub 20 move in unison, in directions relative to one another.

Thus, in the steering assembly 10, the torque of the steering wheel 24 is translated through the rimmed hub 20 through the flexure element 16 and through the rimless hub 14 to the steering column 12 to rotate the steering column 12. In the operation of the steering wheel 24 of one embodiment, the operation of turning the steering wheel in order to control the tires of a vehicle is similar in function to a conventional steering system. Rotation of the steering wheel 24 controls the direction of the vehicle's tires (not shown).

The flexure elements 16 provide for rigid support of the rimmed hub 20 and steering wheel 24 when a torque is applied to the steering wheel and the rimmed hub 20, in a manner similar to turning the steering wheel to control the tires of the vehicle (not shown). The flexure elements 16 allow for flexible support of the rimmed hub 20 and steering wheel 24 in a direction substantially parallel to the long axis of the steering column 12.

Figure 2:
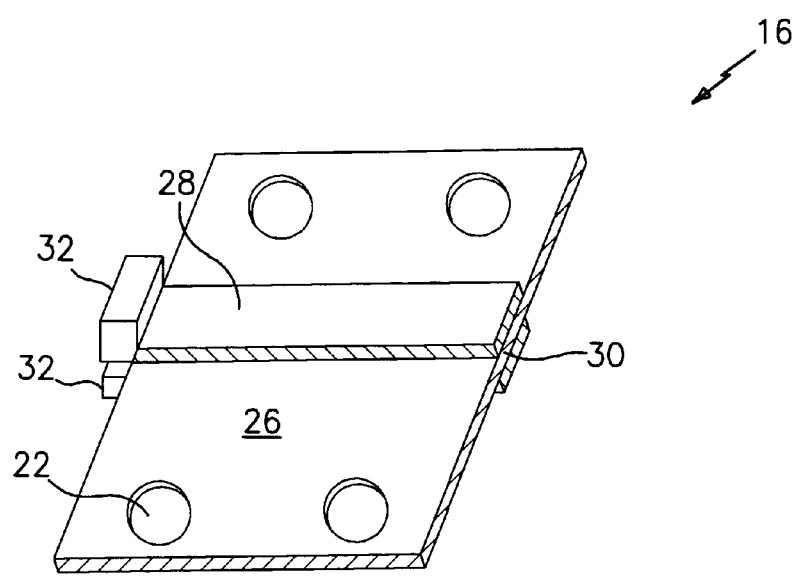
FIG. 2 is a perspective view of an exemplary embodiment of a flexure element.

Turning now to FIG. 2, an exemplary embodiment of a flexure element 16 is illustrated. Flexure element 16 is shown including a flexure body 26. Flexure body 26 is shown in a preferred embodiment as being substantially planar in shape (a plate). Flexure body 26 has a mechanical structure that makes it rigid enough to translate the rotational force applied to the steering system.

Flexure body 26 has a mechanical structure that makes it flexible enough to dampen vibrations from the steering column 12, thus decreasing vibrations in the steering wheel 24. These flexures were designed to be stiff in the horizontal direction but flexible in the vertical direction. They were vertically flexible for two reasons. One reason is so that the resonant frequency of the isolation system needs to be lower than that of the unmodified system to take advantage of the passive isolation effects.

In a preferred embodiment, the flexure body 26 is an aluminum alloy plate that has a thickness of one thirty-second of an inch (1/32 inch). Flexure body 26 has a platen shape as shown in the FIGS. 1–6. Of course, it is contemplated that the flexure body 26 may be a variety of materials and shapes that provide both flexibility and rigidity to the forces encountered in the steering system. Disposed on or through the flexure body 26 is the flexure mount 22. There may be a plurality of flexure mounts 22. A preferred embodiment has four flexure mounts 22 disposed through the flexure body 26 to couple the flexure body 26 to two adaptors 21 (see FIG. 1 and FIG. 6).

In the preferred embodiment, the flexure mount 22 is a hole or passage that allows for a fastener to insert through the flexure body 26 and into or through the adaptor 18, thereby securely fastening it. In some embodiments, the flexure mounts 22 function to hold the flexure body 26 to the adaptor 18 which is mounted to the rimmed hub 20 and the adaptor 18 mounted to the rimless hub 14. In other embodiments, the flexure mounts 22 secure the flexure body 26 directly to each of the rimmed hub 20 and the rimless hub 14.

Disposed on flexure body 26 is a first actuator 28. Opposite first actuator 28 is a second actuator 30. There may be a plurality of actuators or a single actuator.

Actuators 28 and 30 are electromechanical transducers that convert electrical energy to mechanical energy. The electromechanical transducers may use an electrostrictive element, a magnetostrictive element or a piezoelectric element. In a preferred embodiment, the actuators are piezoelectric ceramic strain transducers. Piezoelectric elements contract and expand in proportion to applied voltage. The actuators are mounted on the flexure body 26 to provide an electrical signal responsive to the vibration of the flexure body 26.

In the preferred embodiment, as shown in FIG. 2, there is a first actuator 28 and a second actuator 30 on opposite faces of the plate-shaped flexure body 26. The first actuator 28 and the second actuator 30 may be connected to the flexure body 26 by being bonded to the flexure body 26. The orientation of the actuators on the flexure body is such that they are in a position to substantially cancel the vibration that is translating along the flexure body 26 from the rimless hub 14 to the rimmed hub 20.

In the preferred embodiment, the actuators are located at optimum points along the transmission path between the disturbances (vibrations from the steering column 12) and the steering wheel 24. Coupled to the first actuator 28 is a controller 32. Typically, there is one controller 32 for each actuator. The controller 32 may be remotely coupled to the actuator. In an exemplary embodiment, second actuator 30 also has a controller 32.

The controller 32 electrically communicates with the actuators. The controller 32 sends electrical signals to the actuator. Each controller 32 is of a simple design that makes the controller 32 robust to small system changes. In one embodiment, the electrical signal may be applied to a damping resistor connected across the transducer output terminals, or the signal may be fed to electronic processing circuitry (not shown) for developing an appropriate control signal which is fed back to the actuator.

In a preferred embodiment, the flexure element 16 uses active vibration control techniques to reduce the vibrations in the structures of the damped steering assembly 10. The flexure element 16 senses the motion of the structure (rimless hub 14, rimmed hub 20) with sensors 34 (see FIG. 3) such as accelerometers, and then calculates the bending vibrations from the sensed motion using a computer or controller such as the controller 32. The flexure element 16 then produces canceling bending vibrations generally equal in amplitude and opposite in phase to the calculated bending vibrations.

In an exemplary embodiment, the actuators are piezoceramic actuator plates. The piezoceramic plates bendably vibrate the flexure body 26 to produce the canceling bending vibrations. In one embodiment, the piezoceramic plate (actuator 28) is driven by a signal such that when the signal is positive, the actuator 28 causes the flexure body 26 to bendably deflect in a first direction from its resting state, and when the signal is negative, the actuator 28 causes the flexure body 26 to bendably deflect in the opposite direction.

In an exemplary embodiment, the vibration characteristics of the damped steering assembly 10 can be empirically measured and stored. Preset values may be encoded (programmed) into the controller 32. The programmed controller 32 can provide signals to the actuator 28. The control signals are based on the empirical or theoretical (in other words, another embodiment uses a mathematical model derived from physics) data gathered which is specific to the vibration and structural characteristics of the damped steering assembly 10. When the damped steering assembly 10 experiences the vibration during operating conditions, the controller 32 can communicate the signals to the actuators to generate the canceling bending vibration. The flexure element 16 actively controls the vibration being transmitted with the actuators and controllers 32. For example, performance of steering system 10 with controller 32 off resulted in a 5 dB reduction from shaft 12 due to the passive damping effects of the isolation system as compared to a steering shaft without the isolation system. Additionally, performance of steering system 10 with controller 32 on resulted in a total 22 dB reduction from shaft 12 due to the active and passive damping effects of the isolation system as compared to a steering shaft without the isolation system.

Figure 3:
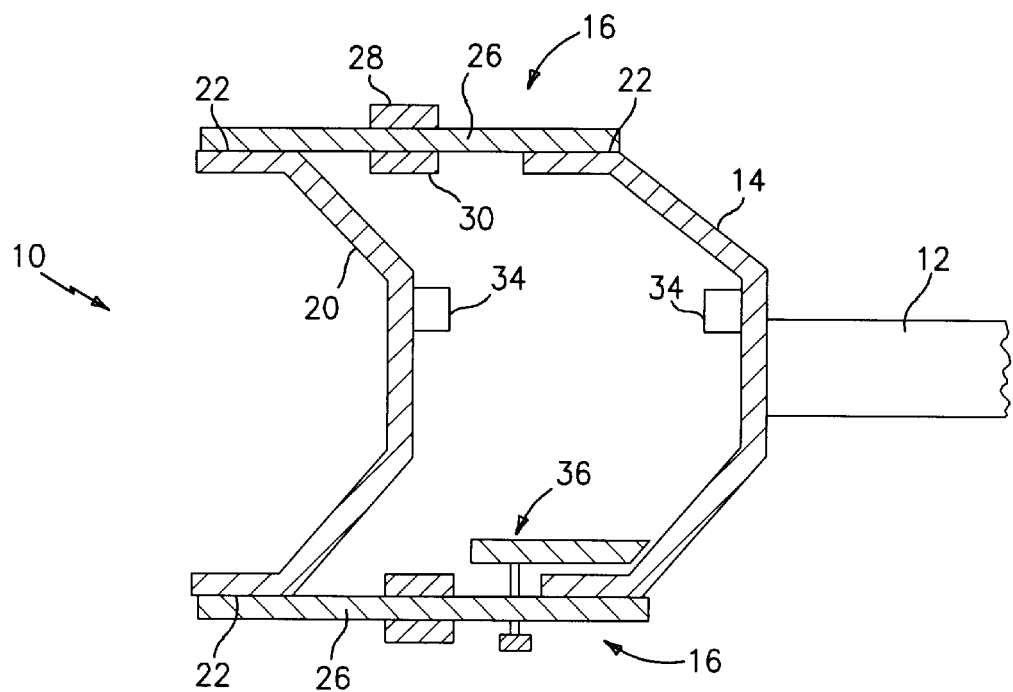
FIG. 3 is a section view of an exemplary embodiment of a damped steering assembly without the steering wheel.
Figure 4:
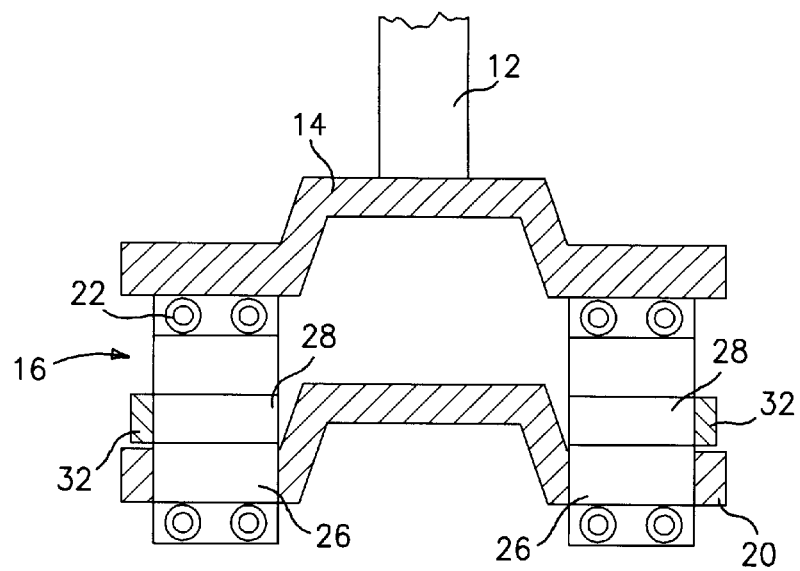
FIG. 4 is a plan view of an exemplary embodiment of a damped steering assembly without the steering wheel.

Turning now to FIGS. 3 and 4, a cross sectional view of a portion of steering assembly 10 is shown. FIG. 3 is a sectional view from one side of the damped steering assembly 10 without the steering wheel 24. Steering column 12 is shown connected to the rimless hub 14 which is coupled to the flexure element 16. Flexure element 16 is coupled to the rimmed hub 20, and the steering wheel 24 (not shown) would be connected to the rimmed hub 20. Disposed on opposite sides of the flexure body 26 are the actuators 28 and 30 (controller 32 not shown in FIG. 3). The flexure element 16 is coupled to both the rimless hub 14 and the rimmed hub 20 by flexure mounts 22 (adapters 18 not shown in this embodiment).

In an exemplary embodiment, rimless hub 14 and flexure elements 16 lengthens the entire steering assembly 10 by about one and a half inches (1.5 inches).

As an alternative, as shown in FIG. 3, a load limiter 36 can be added to the steering assembly 10 to allow for high static loads while not changing the stiffness of the flexure elements 16. The load limiter 36 is coupled to the rimless hub 14 and coupled to the flexure elements 16.

The load limiters 36 or mechanical stops are added to impede the motion of the flexure body 26 up to a certain amount of deflection of the flexure element 16. In one embodiment, the load limiter 36 allows about five tenths of a millimeter (0.5 mm) of tolerance for the flexure elements 16 to move or flex while in motion. This deflection value is below the tensile stress limit of an aluminum alloy plate which corresponds to about eighty-eight hundredths of a millimeter (0.88 mm) when under a deflection load. FIG. 4 shows a diagram of an embodiment from a top view. The same elements are shown in FIG. 4, as are also shown in FIG. 3, with the addition of the controller 32 and the deletion of the actuator 30 and load limiter 36. The embodiment shown in FIG. 4 depicts the flexure mounts 22 connected to the rimless hub 14 at a position distal from the steering column 12.

Figure 5:
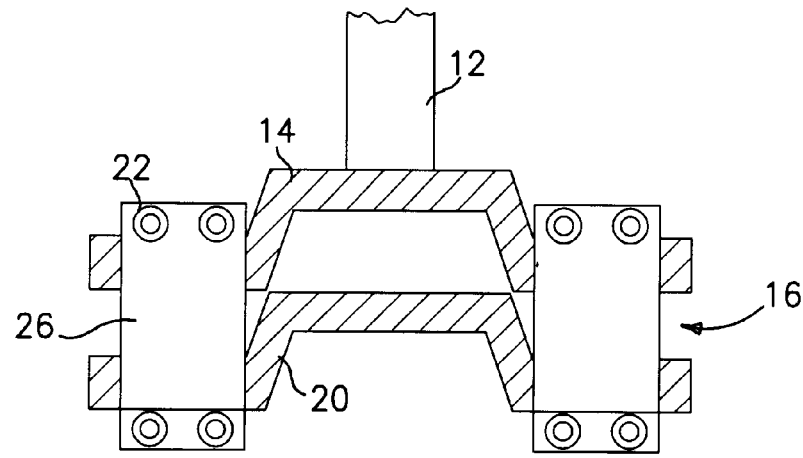
FIG. 5 is a plan view of another exemplary embodiment of a damped steering assembly without the steering wheel.

FIG. 5 illustrates an alternative embodiment of the steering assembly 10. Here the flexure mounts 22 are connected to the rimless hub 14 more proximate to the steering column 12. This reduces the total length of the damped steering assembly 10. Accordingly, rimmed hub 20 is positioned closer to the rimless hub 14 as compared to the embodiment shown in FIG. 4.

Figure 6:
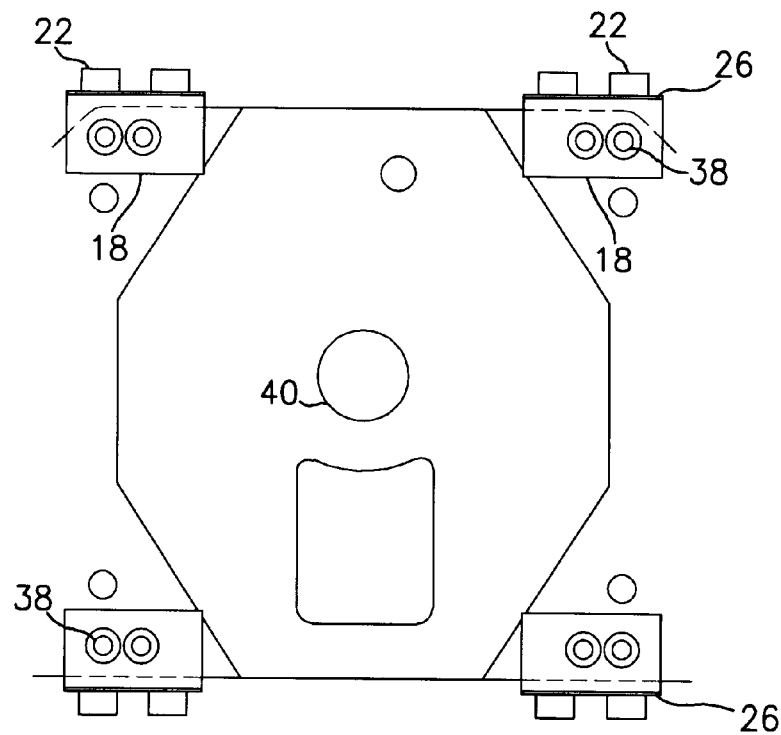
FIG. 6 is a front view of an exemplary embodiment of a damped steering assembly without the steering wheel.

FIG. 6 shows a front view of a diagram depicting an alternative embodiment of the damped steering column 10 without the steering wheel and other elements. In this figure, the relationship of the flexure body 26 and the adapter 18 can be seen. In the preferred embodiment, fasteners 38 are used to attach the adapters 18 to the rimmed hub 20 and the rimless hub 14. The flexure mounts are also depicted in relationship to the adapters and the fasteners. A thru-hole 38 is disposed in the rimless hub 14 to couple the rimless hub 14 to the steering column 12. The rimmed hub 20 may also have a thru-hole 40.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A damped steering assembly for a vehicle comprising:
    a steering column;
    a steering wheel coupled to said steering column by a flexure element wherein said steering wheel controls steering of said vehicle; and
    an active vibration control mechanism disposed on said flexure element, said active vibration control mechanism being configured to cancel vibration transmitted from said steering column to said steering wheel.

2. The damped steering assembly as in claim 1, wherein said flexure element is a passive vibration control mechanism being configured to dampen vibration transmitted from said steering column to said steering wheel.

3. The damped steering assembly as in claim 2 wherein said flexure element includes a flexure body and said active vibration control mechanism includes at least one actuator disposed on said flexure body and a controller coupled to said at least one actuator wherein said controller communicates a signal to said actuator to activate said actuator disposed on said flexure body to cancel vibration transmitted from said steering column to said steering wheel.

4. The damped steering assembly as in claim 3 further comprising:
    a rimless hub coupled to said steering column;
    a rimmed hub coupled to said rimless hub distal from said steering column, said rimmed hub being connected to said steering wheel, said flexure element is disposed between said rimless hub and said rimmed hub wherein said flexure element couples said rimless hub with said rimmed hub.

5. The damped steering assembly as in claim 4 wherein said flexure body is coupled to said rimless hub and said rimmed hub with flexure mounts.

6. The damped steering assembly as in claim 5 wherein said flexure mount couples to an adaptor coupled to said rimless hub and to an adaptor coupled to said rimmed hub.

7. The damped steering assembly as in claim 3 further comprising:
    a first actuator disposed on said flexure element;
    a second actuator disposed on said flexure element opposite said first actuator;
    a controller coupled to said first actuator; and
    another controller coupled to said second actuator, wherein said flexure element actively cancels vibration transmitted from said steering column to said steering wheel.

8. The damped steering assembly as in claim 3 further comprising:
    a load limiter coupled to said flexure element for limiting motion of said flexure element.

9. The damped steering assembly as in claim 7 wherein said controllers have been programmed to provide control signals, wherein said programming is based on empirical or theoretical data pertinent to cancel steering assembly vibration characteristics.

10. The damped steering assembly as in claim 3 wherein said flexure body is an aluminum alloy plate and said at least one actuator is a piezoelectric ceramic actuator.

11. A damped steering assembly for a vehicle comprising:
    a steering column;
    a rimless hub coupled to said steering column;
    a rimmed hub coupled to said rimless hub distal from said steering column, said rimmed hub being connected to a steering wheel, four flexure elements disposed between said rimless hub and said rimmed hub to couple said rimless hub with said rimmed hub such that said steering wheel controls said steering column; and an active vibration control mechanism disposed on said flexure elements, and each of said flexure elements include a flexure body that is coupled to said rimless hub and said rimmed hub with flexure mounts, said flexure mounts couple an adaptor of said rimless hub to said flexure element and an adaptor of said rimmed hub to said flexure element, each of said adaptors being fastened to each of said rimmed hub and said rimless hub with a fastener, wherein said fastener rigidly fixes said adaptors to each of said rimmed hub and said rimless hub, said active vibration control mechanism includes at least one actuator disposed on said flexure body and a controller coupled to said at least one actuator wherein said controller communicates a signal to said actuator to activate said actuator disposed on said flexure body to cancel vibration transmitted from said steering column to said steering wheel, said flexure elements forming a passive vibration control mechanism that is configured to dampen vibration transmitted from said steering column to said steering wheel.

12. A method of actively controlling vibration transmitted to a steering wheel comprising:

coupling a steering wheel to a steering column;

disposing a flexure element between said steering column and said steering wheel;

sensing a vibration transmitted from said steering column to said steering wheel; and canceling said vibration with said flexure element.

13. The method of actively controlling vibration transmitted to a steering wheel as in claim 12 further comprising:

coupling a rimless hub to said steering column at a distal end of said steering column, said distal end of said steering column being distal from a steering box;

coupling a rimmed hub to said rimless hub distal from said steering column, said rimmed hub being coupled to said steering wheel;

coupling said flexure element between each of said rimmed hub and said rimless hub, said flexure element includes a flexure body, at least one actuator disposed on said flexure body and a controller connected to said at least one actuator;

receiving a vibration signal with said controller;

sending a signal from said controller to said at least one actuator;

flexing said flexure body through actuation of said at least one actuator to produce canceling vibrations; and dampening said vibration transmitted from said steering column to said steering wheel by flexing said flexure body.

14. A steering assembly for a vehicle, comprising:

a steering column having a first end and a second end, said first end being operatively connected with a first hub, and said second end being operatively connectable to a vehicle steering mechanism;

a steering wheel connected to a second hub such that said steering wheel and said second hub move in unison with one another;

a flexure element connecting said first hub and said second hub such that rotational movement of said steering wheel is translated to said steering column; and an actuator disposed on said flexure element, said actuator being controlled to produce canceling vibrations in said flexure element such that resulting vibrations in said steering wheel are less than vibrations transmitted to said flexure element from said steering column.

15. The steering assembly of claim 14, wherein said canceling vibrations are bending vibrations.

16. The steering assembly of claim 15, wherein said bending vibrations are generally equal in amplitude and opposite in phase to vibrations transmitted to said flexure element from said steering column.

17. The steering assembly of claim 14, further comprising more than one flexure element connecting said first hub and said second hub.

18. The steering assembly of claim 14, wherein said flexure element is a plurality of flexure elements.

19. The steering assembly of claim 14, wherein said flexure element has sufficient flexibility to dampen vibrations transmitted to said flexure element from said steering column.

20. The steering assembly of claim 19, further comprising a load limiter coupled to said flexure element.

21. The steering assembly of claim 20, wherein said load limiter does not affect said sufficient flexibility of said flexure element.

22. The steering assembly of claim 21, wherein said load limiter allows about five tenths of a millimeter of tolerance for said flexure element.

23. The steering assembly of claim 19, wherein said flexure element is an aluminum alloy plate that has a thickness of one thirty-second of an inch.

24. The steering assembly of claim 14, wherein said flexure element has a platen shape.

25. The steering assembly of claim 14, wherein said flexure element is stiff in a horizontal direction, but flexible in a vertical direction.

26. The steering assembly of claim 14, further comprising:

a controller;

a first sensor configured to provide a first sensed signal representative of said resulting vibrations to said controller; and a second sensor to provide a first sensed signal representative of vibrations transmitted to said flexure element from said steering column to said controller, said controller controlling said electromechanical actuator to produce said canceling vibrations in response to said first sensed signal and said second sensed signal.

27. The steering assembly of claim 14, further comprising an actuator disposed on opposing sides of said flexure element.

28. The steering assembly of claim 14, where said actuators are located at optimum points along a transmission path of vibration across said flexure element.

29. The steering assembly of claim 14, wherein said actuator is selected from the group consisting of electrostrictive elements, magnetostrictive elements, and a piezoelectric elements.

30. The steering assembly of claim 14, wherein said actuator is a piezoceramic actuator plate.

31. The steering assembly of claim 14, wherein said actuator is an electromechanical transducer configured to convert electrical energy to mechanical energy.

32. The damped steering assembly as in claim 1, wherein said active vibration control mechanism cancels vibration transmitted from said steering column to said steering wheel by generating canceling vibrations.

33. The damped steering assembly as in claim 32, wherein said canceling vibrations are bending vibrations.

34. The damped steering assembly as in claim 33, wherein said bending vibrations are generally equal in amplitude and opposite in phase to said vibration transmitted from said steering column.

35. The method of actively controlling vibration transmitted to a steering wheel as in claim 12 further comprising producing canceling vibrations in said flexure element to cancel said vibration with said flexure element.

36. The method of actively controlling vibration transmitted to a steering wheel as in claim 35 wherein said canceling vibrations are bending vibrations.

37. The method of actively controlling vibration transmitted to a steering wheel as in claim 36 wherein said bending vibrations are generally equal in amplitude and opposite in phase to said vibration to cancel said vibration with said flexure element.

* * * * *